US006683606B1

(12) United States Patent
Yamamoto et al.

(10) Patent No.: US 6,683,606 B1
(45) Date of Patent: *Jan. 27, 2004

(54) VIRTUAL ARCHITECTURE EXPERIENCE METHOD AND APPARATUS

(75) Inventors: Hiroyuki Yamamoto, Chigasaki (JP); Toshikazu Ohshima, Kawasaki (JP); Shinji Uchiyama, Yokohama (JP); Takashi Morino, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/808,899

(22) Filed: Feb. 28, 1997

(30) Foreign Application Priority Data

Mar. 5, 1996 (JP) .............................. 8-047245

(51) Int. Cl.⁷ ............................... G06T 15/00
(52) U.S. Cl. ...................................... 345/419
(58) Field of Search ................ 345/419, 433, 345/420, 418, 426, 427, 428, 619, 620, 629

(56) References Cited

U.S. PATENT DOCUMENTS

| 4,645,459 A | 2/1987 | Graf et al. ..................... 434/43 |
| 4,970,666 A | 11/1990 | Welsh et al. ................. 364/522 |
| 5,467,444 A | 11/1995 | Kawamura et al. ......... 395/141 |
| 5,555,354 A | * 9/1996 | Strasnick et al. ........... 395/127 |
| 5,602,564 A | * 2/1997 | Iwamura et al. ............ 345/119 |

FOREIGN PATENT DOCUMENTS

| EP | 0633549 | 1/1995 |
| FR | 2702291 | 9/1994 |
| WO | 92/09963 | 6/1992 |

OTHER PUBLICATIONS

Lockley et al., "The development of a design tool" Adaptive Intelligent Energy Systems Conf., 2/93, vol. 28, No. 10, pp. 1499–1506.
Plummer et al., "Mass market applications for real–time 3D graphics", 7th Euroographics UK Conf., 3/89, vol. 8, No. 2, pp. 143–150.
Jacobson, "Virtual worlds: a new type of design environment", Virtual Reality World, 5/94, vol. 2, No. 3, pp. 46–52.

* cited by examiner

Primary Examiner—Phu K. Nguyen
(74) Attorney, Agent, or Firm—Fitzpatrick, Cella, Harper & Scinto

(57) ABSTRACT

Three-dimensional geometric data of an architecture is generated, and image mapping data is generated by mapping a texture representing a pattern on the surface of the generated three-dimensional geometric data. A reflection of a virtual space is generated on the basis of the generated three-dimensional geometric data and image mapping data, and is changed in correspondence with movement of the viewpoint and/or the line of sight of the operator, so that the operator can interactively experience the virtual space of the architecture.

25 Claims, 11 Drawing Sheets

FIG. 4

```
                (OBJECT DATA)    (NAME OF OBJECT)
                    → object (A) {
                                 (NAME OF PRIMITIVE)
                    → primitive (a) {
                                      (NAME OF IMAGE TO BE MAPPED
  (PRIMITIVE                           ON THIS PRIMITIVE)
   DATA)
                         image   image_name_of_primitive_a
            (VERTEX DATA) — point  {
  (DATA      ┌「VERTEX」→v    v1x, v1y, v1z    (3D COORDINATE
   REGARDING │                                 OF VERTEX)
   ONE       └「TEXTURE」→t   t1x, t1y         (TEXTURE COORDINATE
   VERTEX)                                     OF THIS VERTEX)
                          v    v2x, v2y, v2z
                          t    t2x, t2y
                          ⋮
                         } patch   {
  (RECTANGLE PATCH) →   Vl1, Vm1, Vn1, Vo1
  (TRIANGLE PATCH)  →   Vl2, Vm2, Vn2,       (SET OF VERTEX
                          ⋮                   COMPRISING ONE PATCH)
                         }
                      {
                      primitive (b) {
                          ⋮
                      }
                      ⋮ locate at x, y, z, α, β, γ    (POSITION AND POSTURE
                                                    WHERE THIS OBJECT IS
                      move {                         LOCATED)
                         RESTRICTION CONDITION ON MOVEMENT
                      }
                  }
                  object (B) {
                  }                        CONTENT OF (   ) IS COMMENT
                  ⋮
```

VIRTUAL ARCHITECTURE EXPERIENCE METHOD AND APPARATUS

BACKGROUND OF THE INVENTION

1. Field of the Invention

The present invention relates to a virtual architecture experience method and apparatus, which can provide images with high reality in correspondence with the requirements of a user.

2. Related Background Art

As a virtual space presentation apparatus with which a user can see a virtual space stored as data in a computer in accordance with the movement of his or her line of sight as he or she observes a real object, various types of apparatuses such as EyePhones (available from VPL Research Inc.) and the like have been developed. Applications of such technique to the housing industry have been examined. For example, a "Virtual Kitchen" system developed by Matsushita Electric Works Ltd. allows a customer to virtually experience the interior of a room and system kitchen provided by the manufacturer, and is used as an instrument of sales promotion.

However, the above-mentioned prior art techniques do not consider a framework that can easily create a virtual space with high reality, and creating the virtual space requires much labor. Accordingly, the existing systems allow users only to experience virtual spaces provided by information providers. As a consequence, it is difficult to easily create a virtual space in an existing architecture owned by a customer like in re-form simulation of an architecture and to allow the customer to interactively experience the virtual space by means of reflections with high reality.

SUMMARY OF THE INVENTION

It is an object of the present invention to provide a virtual architecture experience method and apparatus, which can solve the above-mentioned problems, and allow a user to easily create a virtual space of an architecture and to virtually experience the created virtual space.

In order to achieve the above object, a virtual architecture experience method of the present invention comprises: the virtual space generation step of generating virtual space data of an architecture on the basis of an instruction of an operator; and the virtual space display step of displaying the virtual space data generated in the virtual space generation step on the basis of an instruction of the operator.

Also, in order to achieve the above object, a virtual architecture experience apparatus of the present invention comprises: virtual space generation means for generating virtual space data of an architecture on the basis of an instruction of an operator; and virtual space display means for displaying the virtual space data generated by the virtual space generation means on the basis of an instruction of the operator.

BRIEF DESCRIPTION OF THE DRAWINGS

FIG. 4 is a chart showing the format of virtual space data of the virtual architecture experience apparatus of the first embodiment;

DETAILED DESCRIPTION OF THE PREFERRED EMBODIMENTS

(a) First Embodiment

The preferred embodiments of the present invention will be explained hereinafter with reference to the accompanying drawings.

In a virtual architecture experience apparatus of the first embodiment, a plan of an existing architecture, a picture of the interior of the architecture, and a panorama picture of the landscape taken at the terrace are prepared. The panorama picture is obtained by image processing for acquiring a field angle wider than that determined by a photographing device and can be created by a technique described in, e.g., U.S. Pat. 5,727,093, filed by the present applicant. The plan of the architecture is then input as an image to the apparatus. A user traces, e.g., walls in the input image using a mouse or tablet to give information of the sizes, heights, shapes, and the like to them, thereby generating three-dimensional (3D) geometric data of the architecture. If the plan of the architecture is not available, 3D geometric data of the architecture created by another 3D modelling software program may be used. The 3D geometric data of the architecture is arranged in a cylindrical space that represents the surrounding landscape. Then, the actually taken image of the interior of the architecture and the panorama image of the landscape are input to the apparatus. The input images are subjected to conversion of colors and gradation, correction of geometric distortion, and the like by a separately prepared image edit program (e.g., PhotoShop available from Adobe Systems Inc.) if necessary. Mapping of feature points in the images to the corresponding vertices of 3D geometric data is interactively designated. In this mapping technique, for example, a technique for associating the positions of points designated on a polygon image to the positions of points designated on an original texture image including required texture images may be used (U.S. application Ser. No. 08/721,219 (EP Appln. No. 96307096)). With this mapping, the correspondences between the vertices in the 3D geometric data and the positions in each image can be designated.

The created 3D geometric data and image mapping data are stored as virtual space data.

On the other hand, upon experiencing the virtual space, the stored virtual space data are loaded, and a 3D space reflection is presented on a graphic workstation (e.g., IRIS Crimson with Reality Engine; available from Silicon Graphics Inc. (SGI)) using a computer graphics technique. At this time, in addition to projection of 3D geometric data onto the reflection, images designated as the image mapping data are texture-mapped on the 3D geometric data, thereby presenting the reflection with high reality. Also, an image for 3D vision is presented, and a reflection which changes in real time in response to interactive operations by an operator for moving the viewpoint/line of sight, furniture, and the like, or changing images used for texture mapping is presented, thus providing virtual experience with reality.

Figure 1:
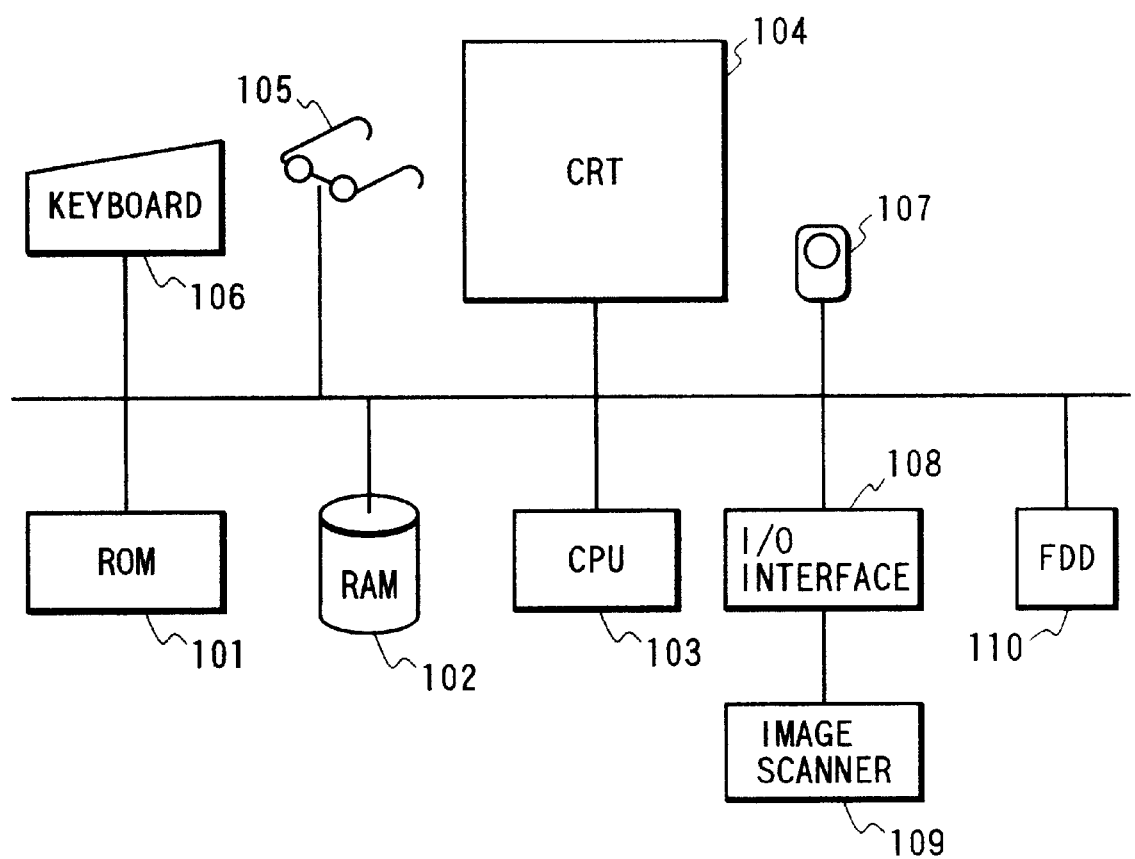
FIG. 1 is a block diagram showing the arrangement of a virtual architecture experience apparatus according to the first embodiment of the present invention.

FIG. 1 is a block diagram showing the basic arrangement of the virtual architecture experience apparatus according to the first embodiment of the present invention. In FIG. 1, a ROM 101 stores a program of the processing procedure. A RAM 102 stores information required for processing and input/output data. A CPU 103 executes processing in accordance with the stored program. A CRT 104 displays information required for processing and a 3D image. 3D vision spectacles 105 have a line of sight detection function of detecting the 3D position of the viewpoint of an observer with respect to the CRT 104 and the direction of line of sight. A keyboard 106 is used by a user to input data and instructions. A mouse 107 is used by the user to input instructions on the CRT 104. Image data is fetched from an image scanner 109 via an input/output (I/O) interface 108. A floppy disk (FD) as a storage medium is inserted into a floppy disk drive (FDD) 110. Note that a drive for another storage media such as a hard disk, a magnetic tape, or the like may be used in place of the FDD 110. Data (3D geometric data, image data, and virtual space data) created by an external apparatus or another application program may be fetched via these storage media.

In the first embodiment, the processing procedure includes virtual space generation processing for interactively generating virtual space data of an architecture on a computer, and virtual space experience processing for allowing an operator to interactively experience the virtual space on the computer using the computer graphics technique with respect to the virtual space data created in the generation processing, and the program writing this processing procedure is stored in the ROM 101.

Figure 2:
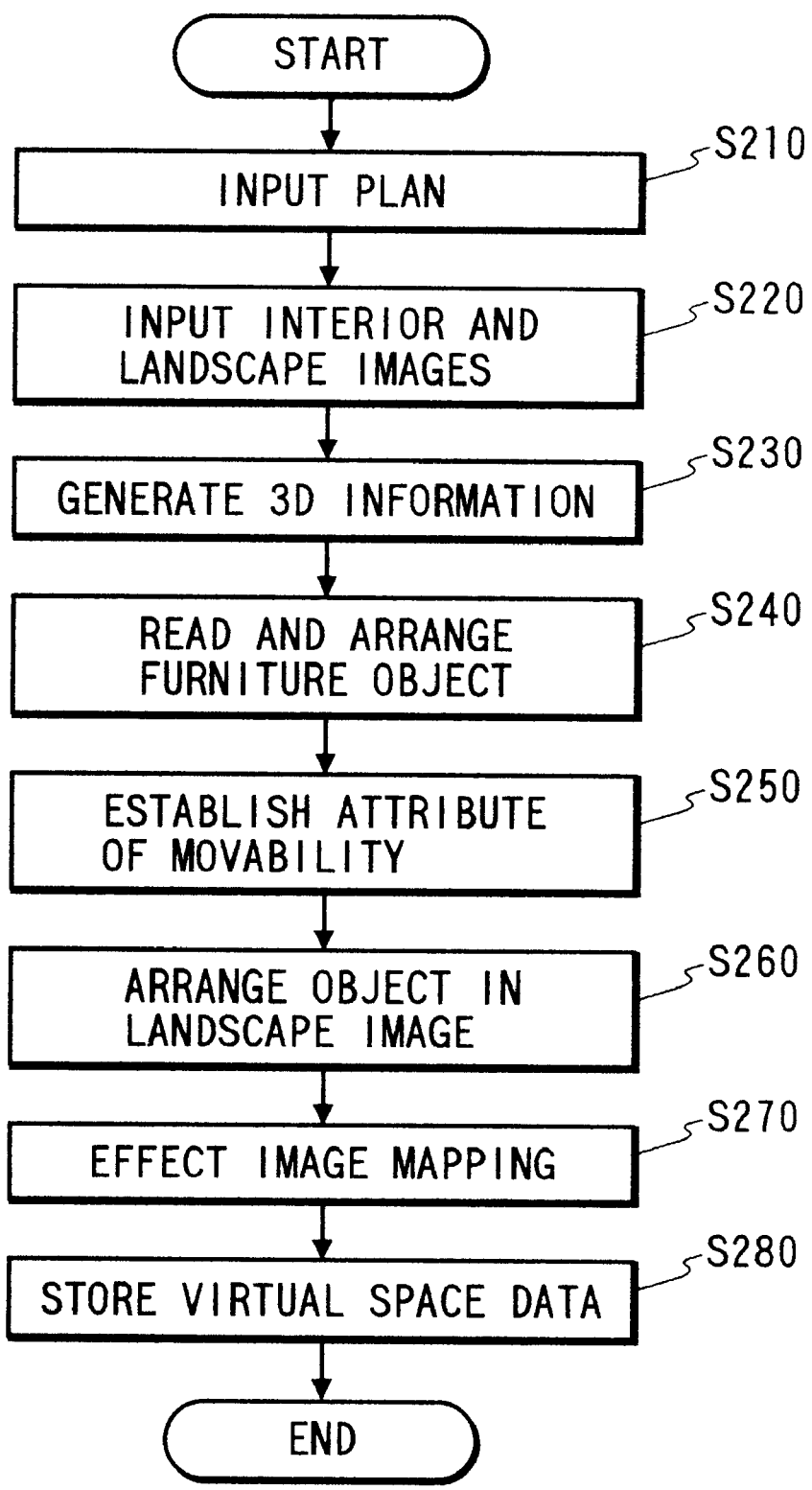
FIG. 2 is a flow chart showing the virtual space generation processing of the virtual architecture experience apparatus of the first embodiment.

FIG. 2 shows the flow of the virtual space generation processing in the first embodiment. In FIG. 2, the arrows indicate the flow of processing. In the first embodiment, a plan of an architecture is stored in the RAM 102 as an image using the image scanner 109 (step S210). Also, a picture of the interior of the architecture and a panorama image of the exterior landscape are stored as images in the RAM 102 using the image scanner 109 (step S220). In step S230, 3D geometric data of the architecture is generated by interactive operations with the user on the basis of the image of the plan of the architecture stored in the RAM 102. The 3D information generation processing will be described later with reference to FIG. 3. In step S240, geometric data of furniture objects and the like created by another modelling software program are fetched from an FD into the RAM 102 via the FDD 110, and these objects are arranged in the 3D geometric data generated in step S230. In step S250, an attribute indicating whether or not an object is movable is assigned to the respective objects in the 3D geometric data generated in the steps executed so far. In step S260, the 3D geometric data generated in the steps executed so far are arranged in 3D geometric data representing the shape of the landscape. In step S270, the user interactively designates the correspondences between feature points of the actually taken image of the interior of the architecture and the panorama image of the landscape, and the vertices in the 3D geometric data. In this image mapping processing, a plurality of images can be mapped on a single primitive using the technique for associating the positions of points designated on a polygon image to the positions of points designated on an original texture image including required texture images (U.S. application Ser. No. 08/721,219 (EP Appln. No. 96307096)). The 3D geometric data and image mapping data are stored in the RAM 102 as virtual space data in the format shown in FIG. 4 (step S280). Upon completion of step S280, the virtual space generation processing ends.

In the data shown in FIG. 4, an "object" (e.g., "living • dining room" or the like) that realizes one function is defined by some "primitives" (e.g., a portion such as "east wall" defined by one texture and surface attribute). Each primitive is defined by at last one plane, and each plane is defined by a triangle or rectangle patch. For each patch, the 3D geometric data describes 3D data of vertices that define the patch, and the connection relationship of the vertices. For an object designated as a movable object in the 3D information generation processing in step S230, the 3D geometric data clearly describes a flag indicating that it is movable, and the conditions for movement. The image mapping data describes the names of images corresponding to primitives, and the correspondences between the vertices in each primitive in the 3D geometric data and the positions on the corresponding image.

Figure 5:
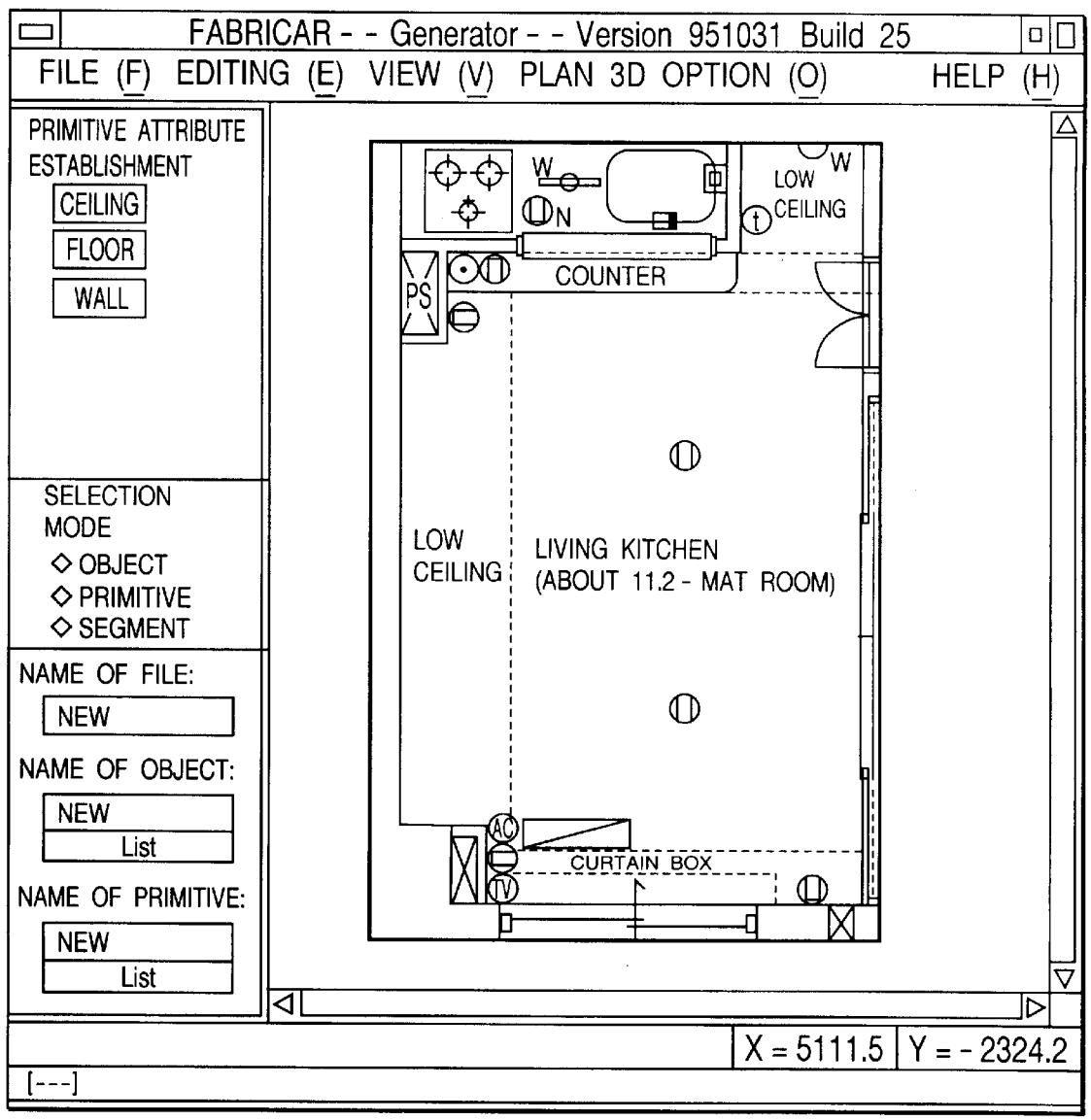
FIG. 5 illustrates an example of the screen display of the 3D information generation processing of the virtual architecture experience apparatus of the first embodiment.
Figure 6:
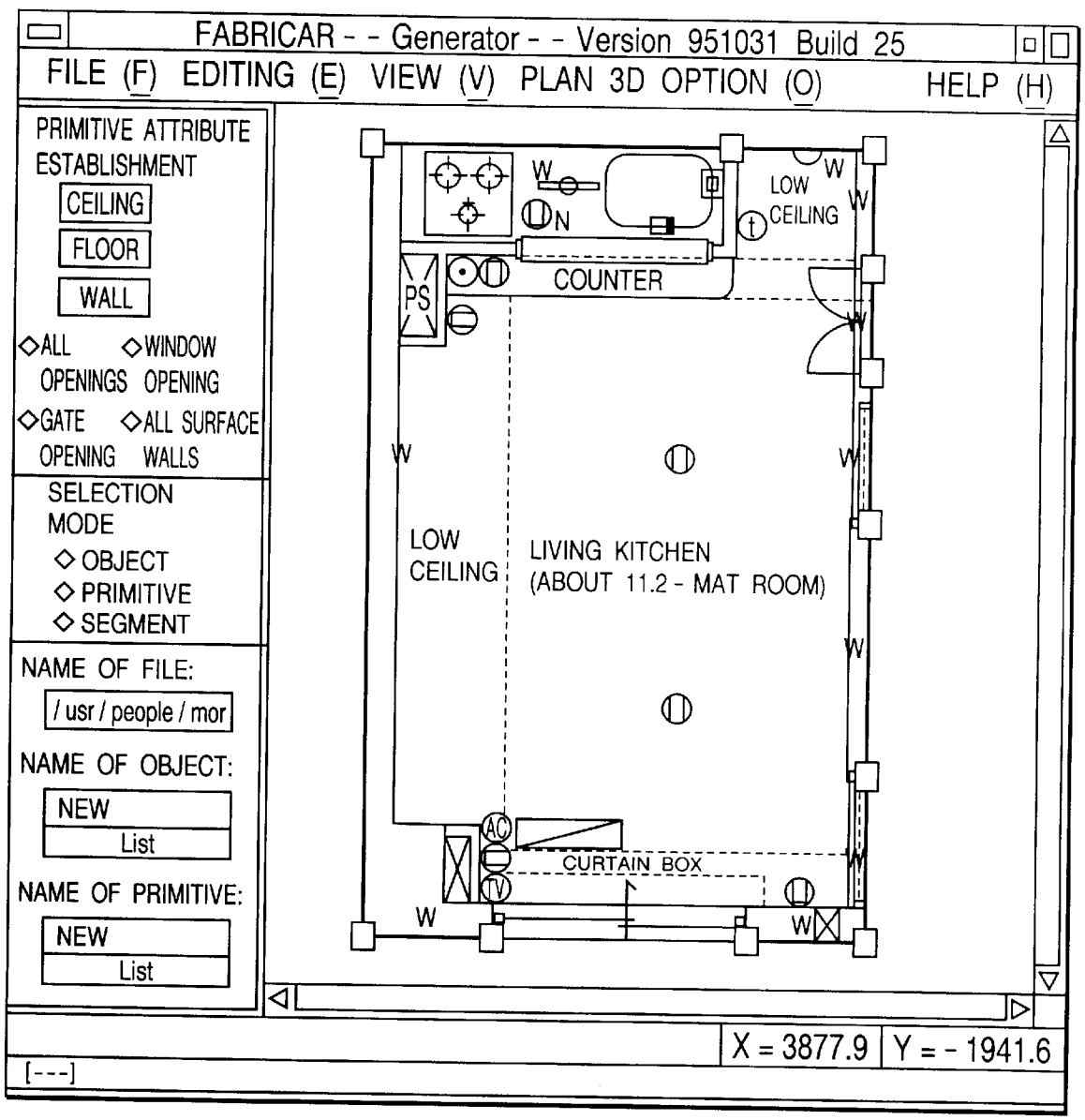
FIG. 6 illustrates an example of the screen display of the 3D information generation processing of the virtual architecture experience apparatus of the first embodiment.
Figure 7:
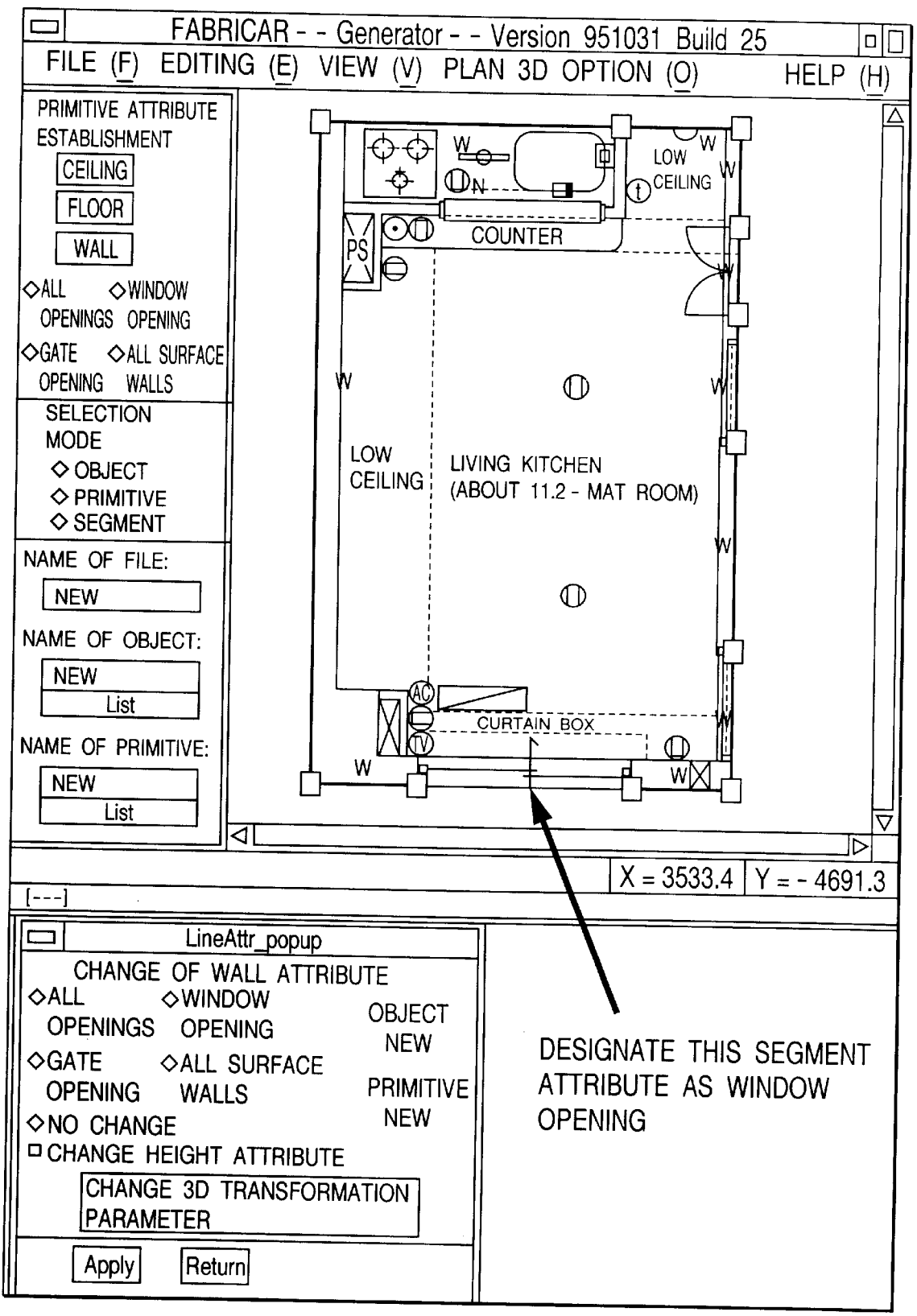
FIG. 7 illustrates an example of the screen display of the 3D information generation processing of the virtual architecture experience apparatus of the first embodiment.

The 3D information generation processing in step S230 will be described below with reference to FIG. 3. In the 3D information generation processing, one plan image of the architecture object stored in the RAM 102 is displayed on the CRT 104 (step S310). The user then inputs the name of the displayed plan object (step S320) and designates the reduced scale of an actual size using the keyboard 106 (step S330). With this operation, the correspondence between the length of a segment on the image and the actual size can be obtained. FIG. 5 shows this state. 3D geometric data (primitives and patches) generated thereafter belong to this object. The user inputs the name of the primitive to be traced using the keyboard 106 (step S341). Then, the user designates points on the image corresponding to the vertices of the primitive using the mouse 107, thereby tracing the primitive appearing on the plan (step S342). FIG. 6 shows this state. As shown in FIG. 7, attributes as to the types (a normal wall, a wall with an opening for a door, and the like) of walls are set for all segments that connect the vertices (step S343). Step S343 is repeated until attributes are set for all the segments (step S344), and steps S341 to S344 are repeated until all the primitives are traced (step S345).

Figure 8:
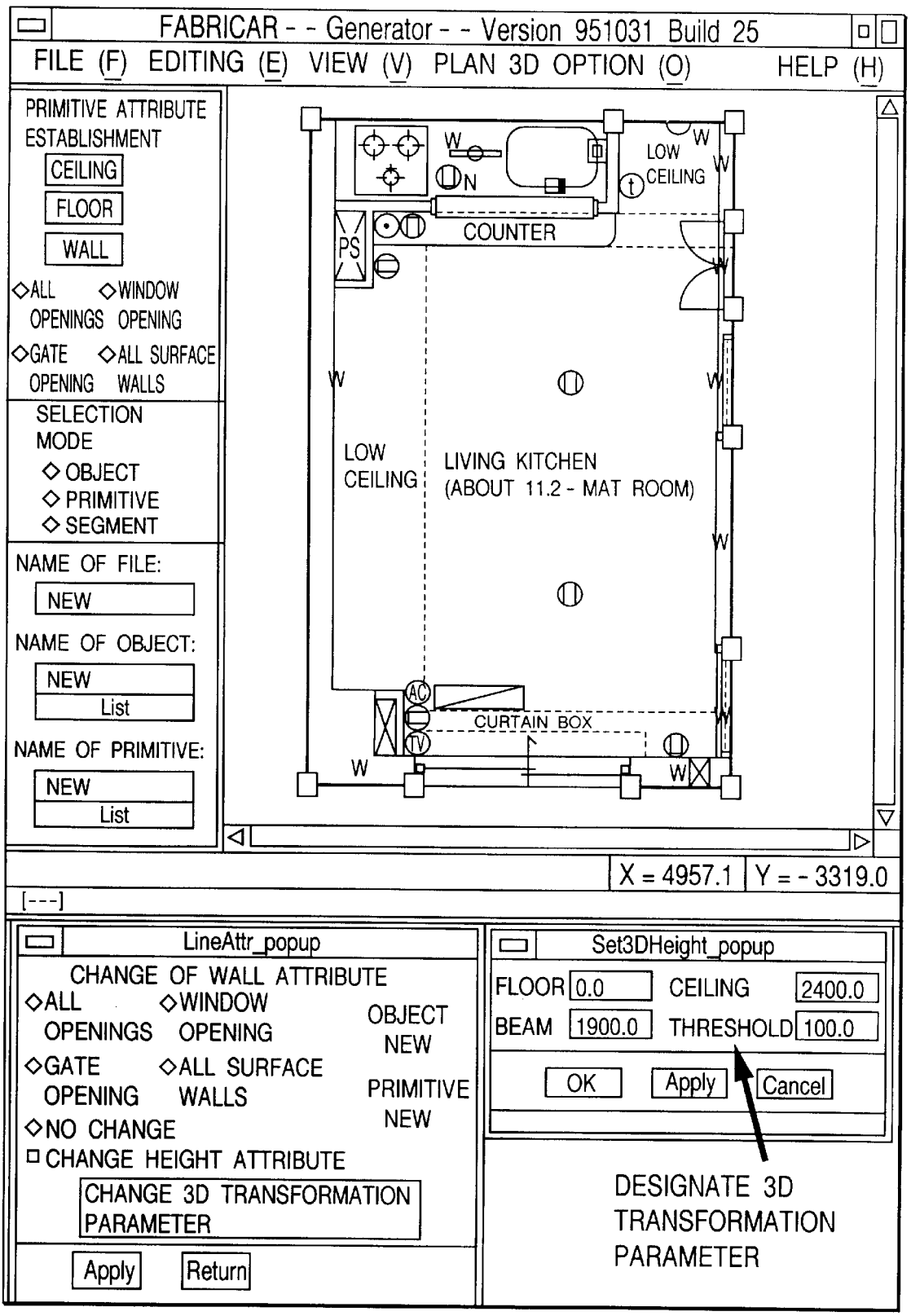
FIG. 8 illustrates an example of the screen display of the 3D information generation processing of the virtual architecture experience apparatus of the first embodiment.

In steps S341 to S345, since primitives are designated using the segments on the plan, the shapes of only walls perpendicular to the plan are generated. Subsequently, floor and ceiling primitives parallel to the plan are generated in turn. The names of the floor and ceiling primitives to be generated are designated (step S351). The four corners appearing on the plan of the floor or ceiling are designated using the mouse 107 on the plan displayed on the CRT 104 (step S352). Finally, the heights of the floor and ceiling are input (step S353). FIG. 8 shows this state. Steps S351 to S353 are repeated until all the floor and ceiling areas are designated (step S354), and patches that define 3D geometric data are generated on the basis of these pieces of information (step S360). These processing operations are repeated for all the objects included in the architecture (step S370). The objects are interactively arranged (step S380) to express 3D data of all the objects by a single coordinate system. The generated 3D information is stored in the RAM 102 in the format shown in FIG. 4 (step S390).

Figure 9:
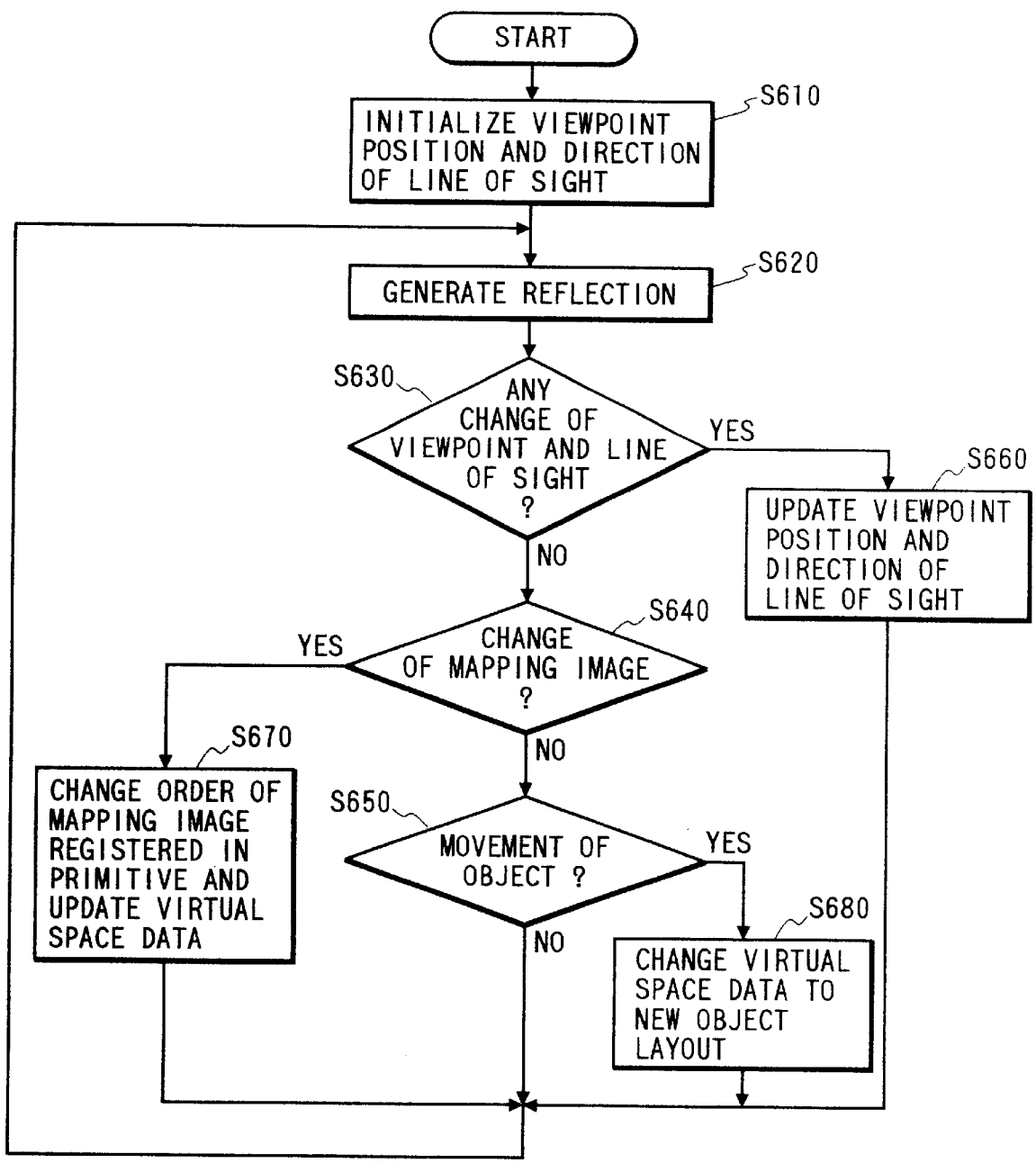
FIG. 9 is a flow chart showing the virtual space experience processing of the virtual architecture experience apparatus of the first embodiment.

On the other hand, FIG. 9 shows the flow of the virtual space experience processing in the first embodiment. As in the flow of the processing of a normal virtual experience system, virtual space data is drawn in correspondence with changes in viewpoint position and direction of line of sight, and at the same time, the virtual space data is changed and re-drawn in correspondence with an event from the user. In the first embodiment, the viewpoint position and direction, used upon generating a reflection, are set to be predetermined values (step S610). If there are a plurality of images mapped on the primitives in the virtual space data stored in the RAM 102, an image registered as first data is selected as the object to be mapped. The reflection of the architecture to be observed from the set viewpoint position and direction is generated on the basis of the virtual space data stored in the RAM 102 using the computer graphics function of the graphic workstation, and the generated reflection is displayed on the CRT 104 (step S620). It is then checked based on the position and direction of the user's head with respect to the CRT 104 obtained from the 3D vision spectacles 105, input information from the keyboard 106, and information from the mouse 107 if the viewpoint position and direction have changed (step S630). If YES in step S630, the viewpoint position and direction are re-calculated (S660) to re-generate a reflection (step S620). On the other hand, if NO in step S630, the flow advances to step S640.

When a plurality of images to be mapped are designated for one primitive of the 3D geometric data in the image mapping processing in step S240, it is checked in step S640 if the user has changed an image to be used in texture mapping by directing his or her line of sight on the primitive of interest on the reflection using the line of sight input device of the 3D vision spectacles 105, or by designating the primitive of interest on the reflection using the mouse 107. If YES in step S640, the mapping image is switched to an arbitrary image registered (step S670), and a reflection is generated again (step S620). On the other hand, if NO in step S640, the flow advances to step S650. When a given object in the 3D geometric data is designated as a movable object in the 3D information generation processing in step S230, it is checked in step S650 if the user has moved the object of interest by directing his or her line of sight on the object of interest on the reflection using the line of sight input device of the 3D vision spectacles 105 or by designating the object of interest on the reflection using the mouse 107, and then designating the moving amount using the mouse 107 or the keyboard 106. If YES in step S650, the new object layout is calculated (step S680), and a reflection is generated again (step S620). By repeating such processing operations, the user can see the reflection observed from an arbitrary position, and can observe it while switching textures in correspondence with instructions from the user.

In the first embodiment, the image of the interior of the architecture and the panorama image of the exterior landscape are scanned using the image scanner 109 and are stored in the RAM 102 in step S220, and the correspondences between the feature points in these images and the vertices in the 3D geometric data are designated in step S240. However, in addition to images input from the scanner, an image database that stores images frequently used (e.g., images of all the types of wall papers in an architecture) in advance may be built on an FD to be inserted into the FDD 110, and an image selected from those in the image database may be used. In this manner, the procedure of inputting a picture can be eliminated.

In step S210 in the first embodiment, an image may be input from an external device or another application program via the FDD 110 in place of reading an image using the image scanner 109.

In step S220 in the first embodiment, an image may be input from an external device or another application program via the FDD 110 in place of reading an image using the image scanner 109.

In step S230 in the first embodiment, 3D geometric data may be input from an external device or another application program via the FDD 110 in place of generating 3D geometric data.

In the first embodiment, as shown in FIG. 4, one object is divided into a plurality of primitives (each primitive is defined by a plurality of patches), and textures are mapped in units of primitives. Alternatively, the concept of primitives may be abandoned, and textures may be mapped in units of patches.

Figure 3:
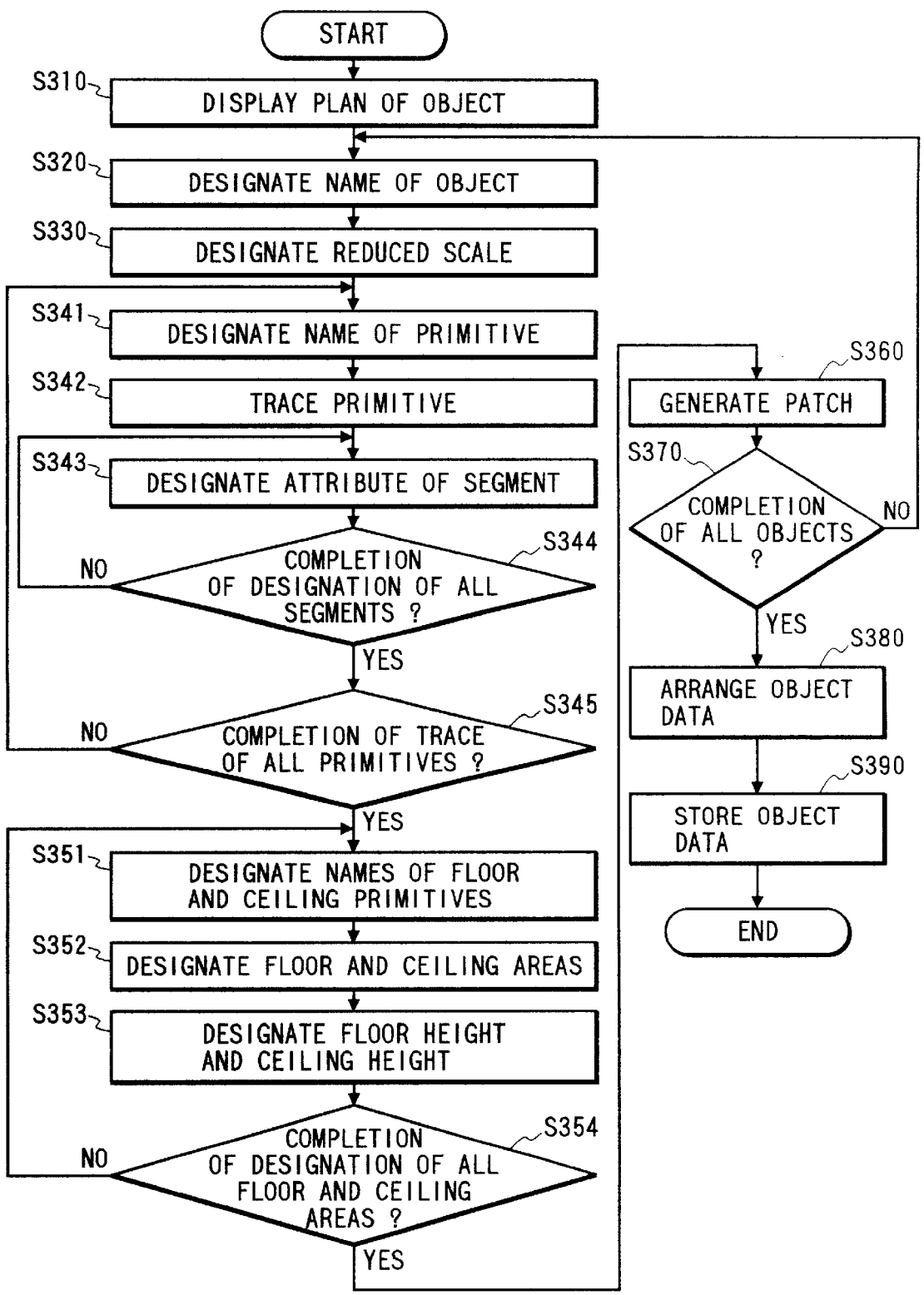
FIG. 3 is a flow chart showing the three-dimensional (3D) information generation processing of the virtual architecture experience apparatus of the first embodiment.

In the first embodiment, as shown in FIG. 3, top-down modelling is made by dividing one object into a plurality of primitives (each primitive is defined by a plurality of patches), and dividing each primitive into patches. Alternatively, bottom-up modelling may be made. That is, a patch may be defined first, and a plurality of patches may be designated as a group to sequentially define one primitive, thereby designating all primitives. Subsequently, a plurality of primitives may be designated as a group to sequentially define one object, thereby defining all objects.

(b) Second Embodiment

Figure 10:
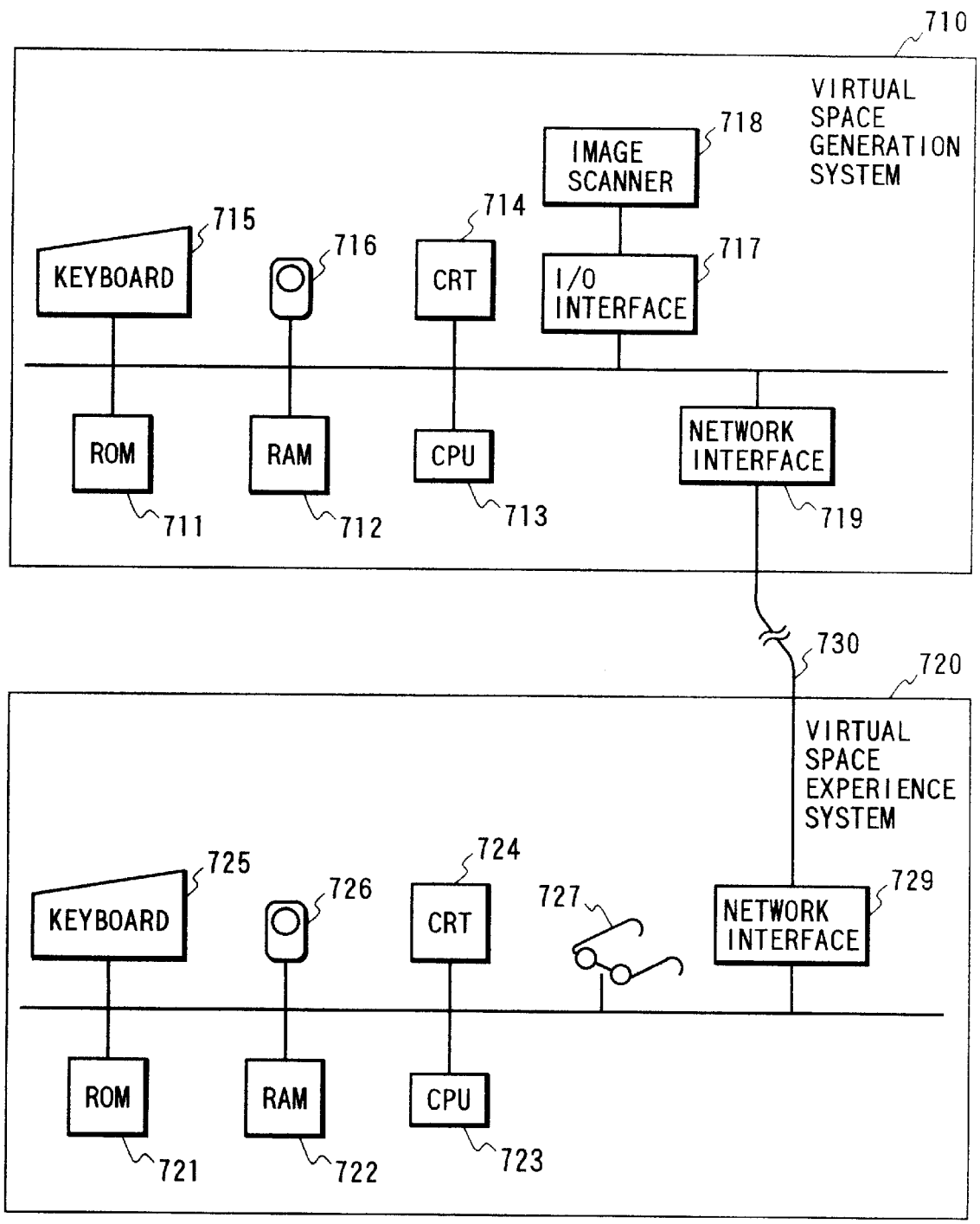
FIG. 10 is a block diagram showing the arrangement of a virtual architecture experience apparatus according to the second embodiment of the present invention.

FIG. 10 shows the basic arrangement of a virtual architecture experience apparatus according to the second embodiment of the present invention. Referring to FIG. 10, a system 710 performs virtual space generation processing, and a system 720 performs virtual space experience processing. In the virtual space generation system 710, a ROM 711 stores a program writing the virtual space generation processing procedure. A RAM 712 stores information required for the processing and input/output data. A CPU 713 executes processing in accordance with the program stored in the ROM 711. A CRT 714 displays information required for the processing, and an image. A keyboard 715 is used by a user to input data and instructions. A mouse 716 is also used by the user to input instructions on the CRT 714. Via an I/O interface 717, image data is fetched from an image scanner 718. A network interface 719 is connected to the virtual space experience system 720 via a network 730 such as Ethernet, ISDN, ATM, or the like. In the virtual space experience system 720, a ROM 721 stores a program writing the virtual space experience processing procedure. A RAM 722 stores information required for the processing and input/output data. A CPU 723 executes processing in accordance with the program stored in the ROM 721. A CRT 724 displays information required for the processing, and a 3D image. A keyboard 725 is used by a user to input data and instructions. A mouse 726 is also used by the user to input instructions on the CRT 724. 3D vision spectacles 727 have a line of sight input function of detecting the 3D position and the direction of line of sight of the viewpoint of the observer with respect to the CRT 724. A network interface 728 is connected to the virtual space generation system 710 via a network such as Ethernet, ISDN, ATM, or the like.

The processing procedures are the same as those in the first embodiment. However, in the first embodiment, virtual space data generated by the virtual space generation processing is stored in the RAM 102, and is shared by the virtual space experience processing. In the second embodiment, virtual space data generated by the virtual space generation processing is stored in the RAM 712 in the virtual space generation system 710. The virtual space data is transferred to the RAM 722 in the virtual space experience system 720 via the network interface 719, the network 730 such as Ethernet, ISDN, ATM, or the like, and the network interface 728 prior to the virtual space experience processing. Thereafter, the virtual space experience processing allows the operator to experience the virtual space using the virtual space data stored in the RAM 722 in the virtual space experience system 720.

With this system, an operator B distant from an operator A assigned to the virtual space generation processing can experience the same virtual architecture as in the first embodiment with only the overhead of the time required for transferring virtual space data via the network.

(c) Third Embodiment

Figure 11:
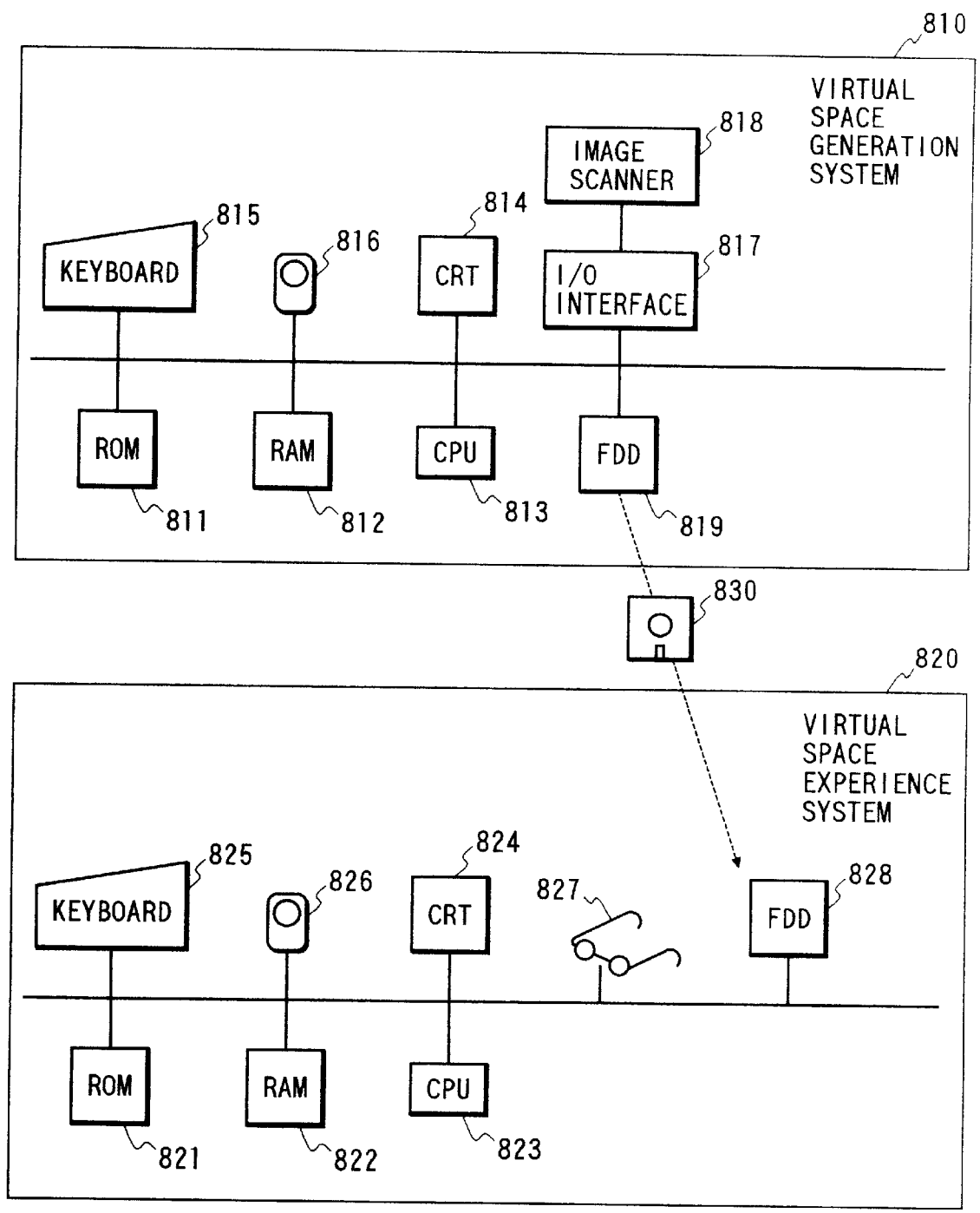
FIG. 11 is a block diagram showing the arrangement of a virtual architecture experience apparatus according to the third embodiment of the present invention.

FIG. 11 shows the basic arrangement of a virtual architecture experience apparatus according to the third embodiment of the present invention. Referring to FIG. 11, a system 810 performs virtual space generation processing, and a system 820 performs virtual space experience processing. In the virtual space generation system 810, a ROM 811 stores a program writing the virtual space generation processing procedure. A RAM 812 stores information required for the processing and input/output data. A CPU 813 executes processing in accordance with the program stored in the ROM 811. A CRT 814 displays information required for the processing, and an image. A keyboard 815 is used by a user to input data and instructions. A mouse 816 is also used by the user to input instructions on the CRT 814. Via an I/O interface 817, image data is fetched from an image scanner 818. An FDD 819 is a floppy disk drive. In the virtual space experience system 820, a ROM 821 stores a program writing the virtual space experience processing procedure. A RAM 822 stores information required for the processing and input/output data. A CPU 823 executes processing in accordance with the program stored in the ROM 821. A CRT 824 displays information required for the processing, and a 3D image. A keyboard 825 is used by a user to input data and instructions. A mouse 826 is also used by the user to input instructions on the CRT 824. 3D vision spectacles 827 have a line of sight input function of detecting the 3D position and the direction of line of sight of the viewpoint of the observer with respect to the CRT 824. An FDD 828 is a floppy disk drive as in the FDD 819. An FD 830 is a floppy disk that stores data via the FDD 819 in the virtual space generation system 810 or the FDD 828 in the virtual space experience system 820.

The processing procedures are the same as those in the first embodiment. However, in the first embodiment, virtual space data generated by the virtual space generation processing is stored in the RAM 102, and is shared by the virtual space experience processing. In the third embodiment, virtual space data generated by the virtual space generation processing is stored in the RAM 812 in the virtual space generation system 810. Prior to the virtual space experience processing, the virtual space data is stored in the FD 830 via the FDD 819. The user carries the FD 830 to the location of the virtual space experience system 820, and stores the virtual space data stored in the FD 830 in the RAM 822 in the virtual space experience system 820 via the FDD 828. Thereafter, the virtual space experience processing allows the operator to experience the virtual space using the virtual space data stored in the RAM 822 in the virtual space experience system 820.

With this system, an operator B distant from an operator A assigned to the virtual space generation processing can experience the same virtual architecture as in the first embodiment.

As described above, according to the present invention, the user can easily generate a virtual space of an existing architecture, and can virtually experience the generated virtual space of the architecture as if he or she were observing an actual object.

What is claimed is:

1. A virtual space producing method comprising:

a virtual space forming step of forming a virtual space by operator-definition using first instructions to input an object definition to be used in generating display data of an object in the virtual space, the operator-definition including inputting structure data for assembling the object in the virtual space, subsequently inputting second instructions to modify the operator-definition of the first instructions, and generating the display data on the basis of the object definition and the structure data in accordance with the second instructions to form the virtual space corresponding to the second instructions; and a virtual space display step of displaying the virtual space formed in accordance with the second instructions in the virtual space forming step, on the basis of the display data generated in the virtual space forming step.

2. A method according to claim 1, wherein the virtual space forming step comprises a three-dimensional information generation step of generating three-dimensional geometric data of the object, and an image mapping step of generating image mapping data by mapping textures representing surface patterns onto individual portions of the three-dimensional geometric data generated in the three-dimensional information generation step, the virtual space data including the three-dimensional geometric data and the image mapping data.

3. A method according to claim 2, wherein the three-dimensional information generation step includes a step of generating the three-dimensional geometric data based on a plan of the object and height information including a height of a ceiling.

4. A method according to claim 2, wherein the three-dimensional information generation step includes a step of arranging the three-dimensional geometric data of the object at a center of a landscape space representing an exterior landscape of the object.

5. A method according to claim 2, wherein the three-dimensional information generation step includes a step of reading and using three-dimensional geometric data of the object generated by another application program.

6. A method according to claim 2, wherein the three-dimensional information generation step includes a step of reading three-dimensional geometric data of interior objects of the object generated by another application program, and arranging the three-dimensional geometric data inside the object.

7. A method according to claim 2, wherein the image mapping step includes a step of mapping actually-taken pictures of an interior of the object onto corresponding portions in the three-dimensional geometric data.

8. A method according to claim 2, wherein the image mapping step includes a step of mapping an actually-taken picture of a landscape onto a landscape space representing an exterior landscape of the object.

9. A method according to claim 2, wherein the image mapping step includes a step of mapping a plurality of textures onto an identical portion of the three-dimensional geometric data.

10. A method according to claim 2, wherein the virtual space display step includes a step of generating a reflection based on the three-dimensional geometric data and the image mapping data of the virtual space data generated in the virtual space forming step, and changing displayed contents in correspondence with movement of a viewpoint and/or a line of sight of the operator.

11. A method according to claim 2, wherein the virtual space display step includes a step of generating a reflection by switching a plurality of textures mapped on an identical portion in the three-dimensional geometric data generated in the virtual space forming step based on an instruction of the operator.

12. A method according to claim 2, wherein the virtual space display step includes a step of generating a reflection by moving three-dimensional geometric data of an interior object arranged inside the object generated in the virtual space forming step based on an instruction of the operator.

13. A virtual space producing apparatus comprising:
    a virtual space former responsive to operator definitions using first instructions to input an object definition to be used in generating display data of an object in the virtual space, the operator definitions being adapted to input structure data for assembling the object in the virtual space, subsequently to input second instructions to modify the operator-definition of the first instructions, and generating the display data on the basis of the object definition and the structure data in accordance with the second instructions to form the virtual space corresponding to the second instructions; and
    a virtual space display constructed and arranged to display the virtual space data formed in accordance with the second instructions by said virtual space former on the basis of the display data generated by the virtual space former.

14. An apparatus according to claim 13, wherein said virtual space former comprises a three-dimensional information generator that generates three-dimensional geometric data of the object, and an image mapper that generates image mapping data by mapping textures representing surface patterns onto individual portions of the three-dimensional geometric data generated by said three-dimensional information generator, the virtual space data including the three-dimensional geometric data and the image mapping data.

15. An apparatus according to claim 14, wherein said three-dimensional information generator generates the three-dimensional geometric data based on a plan of the object and height information including a height of a ceiling.

16. An apparatus according to claim 14, wherein said three-dimensional information generator arranges the three-dimensional geometric data of the object at a center of a landscape space representing an exterior landscape of the object.

17. An apparatus according to claim 14, wherein said three-dimensional information generator reads and uses three-dimensional geometric data of the object generated by another application program.

18. An apparatus according to claim 14, wherein said three-dimensional information generator reads three-dimensional geometric data of interior objects of the object generated by another application program, and arranges the three-dimensional geometric data inside the object.

19. An apparatus according to claim 14, wherein said image mapper maps actually-taken pictures of an interior of the object onto corresponding portions in the three-dimensional geometric data.

20. An apparatus according to claim 14, wherein said image mapper maps an actually-taken picture of a landscape onto a landscape space representing an exterior landscape of the object.

21. An apparatus according to claim 14, wherein said image mapper maps a plurality of textures onto an identical portion of the three-dimensional geometric data.

22. An apparatus according to claim 14, wherein said virtual space display generates a reflection based on the three-dimensional geometric data and the image mapping data of the virtual space data generated by said virtual space former, and changes displayed contents in correspondence with movement of a viewpoint and/or a line of sight of the operator.

23. An apparatus according to claim 14, wherein said virtual space display generates a reflection by switching a plurality of textures mapped on an identical portion in the three-dimensional geometric data generated by said virtual space former on the basis of an instruction of the operator.

24. An apparatus according to claim 14, wherein said virtual space display generates a reflection by moving three-dimensional geometric data of an interior object arranged inside the object generated by said virtual space former on the basis of an instruction of the operator.

25. A storage medium which stores a computer program for realizing a virtual space producing method, the computer program comprising:
    code to form a virtual space by operator-definition using first instructions to input an object definition to be used in generating display data of an object in the virtual space, the operator-definition including inputting structure data for assembling the object in the virtual space, subsequently inputting second instructions to modify the operator-definition of the first instruction, and generating data on the basis of the object definitions and the structure data in accordance with the second instructions to form the virtual space corresponding to the second instructions; and
    code to display the virtual space data formed in accordance with the second instructions in the virtual space forming step on the basis of the display data generated in the virtual space forming step.

* * * * *

UNITED STATES PATENT AND TRADEMARK OFFICE
CERTIFICATE OF CORRECTION

PATENT NO. : 6,683,606 B1
DATED : January 27, 2004
INVENTOR(S) : Hiroyuki Yamamoto et al.

It is certified that error appears in the above-identified patent and that said Letters Patent is hereby corrected as shown below:

Title page,
Item [56], References Cited, OTHER PUBLICATIONS
Line 5, "Euroographics" should read -- Euro-graphics --.

Column 2,
Line 42, ", filed by the present applicant." should read -- (EP Appln. No. 96300782), assigned in common with the present invention. --.

Column 3,
Line 33, "another" should read -- other --.

Column 8,
Line 14, "object." should read -- object --.
     The present invention is not limited to the above embodiments and various changes and modifications can be made within the spirit and scope of the present invention. Therefore, to apprise the public of the scope of the present invention, the following claims are made. --

Signed and Sealed this

Seventh Day of September, 2004

JON W. DUDAS
*Director of the United States Patent and Trademark Office*